Sept. 27, 1966 TAKASHI HOSOGAI ETAL 3,275,293
CONTROL DEVICE FOR CONTROLLING THE CLOSING OPERATION OF WATER
SHUT-OFF MEANS OF A WATER PUMP-TURBINE
Filed July 6, 1964

INVENTORS
TAKASHI HOSOGAI
HIDEO EBISAWA

BY Paul M. Craig, Jr.
ATTORNEY

United States Patent Office 3,275,293
Patented Sept. 27, 1966

3,275,293
CONTROL DEVICE FOR CONTROLLING THE CLOSING OPERATION OF WATER SHUT-OFF MEANS OF A WATER PUMP-TURBINE
Takashi Hosogai and Hideo Ebisawa, both of Hitachi-shi, Japan, assignors to Hitachi, Ltd., Tokyo, Japan, a corporation of Japan
Filed July 6, 1964, Ser. No. 380,495
Claims priority, application Japan, July 9, 1963, 38/35,244
7 Claims. (Cl. 253—24)

This invention relates to water pump-turbines, and more particularly to a control system for controlling the closing operation of the water shut-off means of reversible water pump-turbines.

As is well known, a reversible water pump-turbine has two different functions, i.e., a pump function and a turbine function. The difference between the two functions resides in the opening degree of the conventional water shut-off means used with such pump-turbine, for example, of the conventional guide vanes. Under pump operation, the opening degree of the water shut-off means, i.e., of the guide vanes, remains almost unchanged even if the head changes. Quite to the contrary, under turbine operation, the opening degree of the water shut-off means; that is, of the guide vanes, should be changed in accordance with the head in order to maintain a predetermined regular rotating speed of the turbine. Since the operating condition of the water pump-turbine varies in accordance with whether the pump-turbine operates as a pump or as a turbine, the closing characteristics of the water shut-off means such as the guide vanes under different operating conditions also become different from each other.

When a water pump-turbine is operated as a water pump, in general, it is desirable that the rate of closure of its guide vanes or of any other conventional water shut-off means from a predetermined normal opening degree to a certain value is larger than the rate of closure from said certain value to the fully closed position of the water shut-off means, while when the water pump-turbine is operated as a water turbine, the closing characteristics of the water shut-off means should be in accordance with both of the rise in the number of rotating speed of the water turbine and the water-pressure variation, as is well known.

Thus, the controlling characteristic of water pump-turbine device should be selected depending upon whether it is operated as a water pump or as a water turbine. When it is operated as a water pump, only the quantity of pumped-up water requires control but no control of the rotational speed of the device is necessary since, under pump operation, it is driven by a prime mover at a pre-determined speed. Consequently, the closing speed reducing point may be set at will. To the contrary, when the pump-turbine device is operated as a water turbine, the closing characteristics of the water shut-off means should be so controlled that changes in rotating speed are prevented. Particularly under variable water head, when the load is cut off from the machine in water-turbine operation, it is desirable to limit the closing speed of guide vanes from about the no-load opening. In view of the inherent characteristics of water pump-turbine, there occurs a remarkable change in flow rate efficiency as a function of a rotating-speed change in the region of small guide vane opening, and consequently, even if the rotating speed would be raised temporarily, there is immediately seen a tendency of decrease in rotating speed which tends to drop below the rated rotating speed, resulting in abnormal change in water pressure.

In order to prevent such an abnormal pressure change, it has been found from experience that an extremely effective means resides in closing the guide vanes gradually from about their no-load opening. However, with a water turbine operated under variable water heads, the no-loading opening is of a very wide range. Under such a condition, the closing characteristics for limiting the closing speed of the guide vanes when the load is being cut off, which corresponds to the no-load opening of the above-mentioned wide range, is basically different from the closing characteristics of the guide vanes when the machine is operated as a water pump.

The primary object of the present invention is to provide a control system for water-turbine, whereby the closing characteristics of the water shut-off means of the machine are automatically changed or switched over between the water-pump operation and the water-turbine operation of the machine, for obtaining suitable closing characteristics, respectively.

There are other objects and particularities of the present invention, which will be made obvious from the following detailed description of the invention, with reference to the accompanying drawings, in which.

Figure 1:
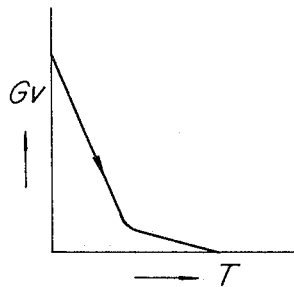
FIG. 1 is a graph showing the closing characteristics of water shut-off means when the machine is operated as a water pump.

Referring to FIG. 1, this figure represents a diagram illustrating a characteristic curve in which the abscissa indicates closing time T, while the ordinate indicates opening degree GV of the water shut-off means or guide vanes of the machine under pump operation. When the opening degree GV has reached a desirable value, the closing speed of the guide vanes is reduced, as hereinabove described, for effectively preventing any abnormal change in water pressure that would otherwise occur at the beginning of the guide-vane closing, as is well known.

Figure 2:
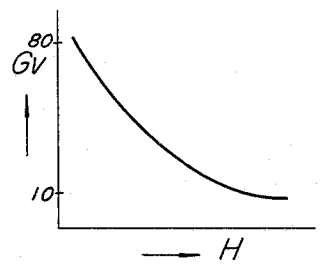
FIG. 2 is a graph showing the relation between the water shut-off means and the water head when the machine is operated as a water turbine.

When, however, the machine is operated as a water turbine under variable water head, the no-load opening degree is of a very wide range, as shown in FIG. 2, in which the abscissa indicates effective water head H, while the ordinate indicates no-load opening degree GV of guide vanes. As is seen from FIG. 2, the no-load opening degree GV of the guide vanes as a function of the varying water head ranges from about 10% to 80%. This is basically different from the closing characteristics of guide vanes in water-pump operation of the machine.

Though the effective water head changes widely under turbine operation, the rotating speed of the water turbine should be kept constant to maintain a predetermined speed in order to generate a constant power, for example when driving a power generator. Consequently, under normal turbine operation, the opening degree of the guide vanes is increased in accordance with the decrease of the water head. It is therefore necessary to provide a vane closing characteristic determined by the opening degree of the vanes when the vanes begin to close and the no-load closing degree, both of which are a function of the water head and the predetermined normal rotating speed of the turbine.

Figure 3:
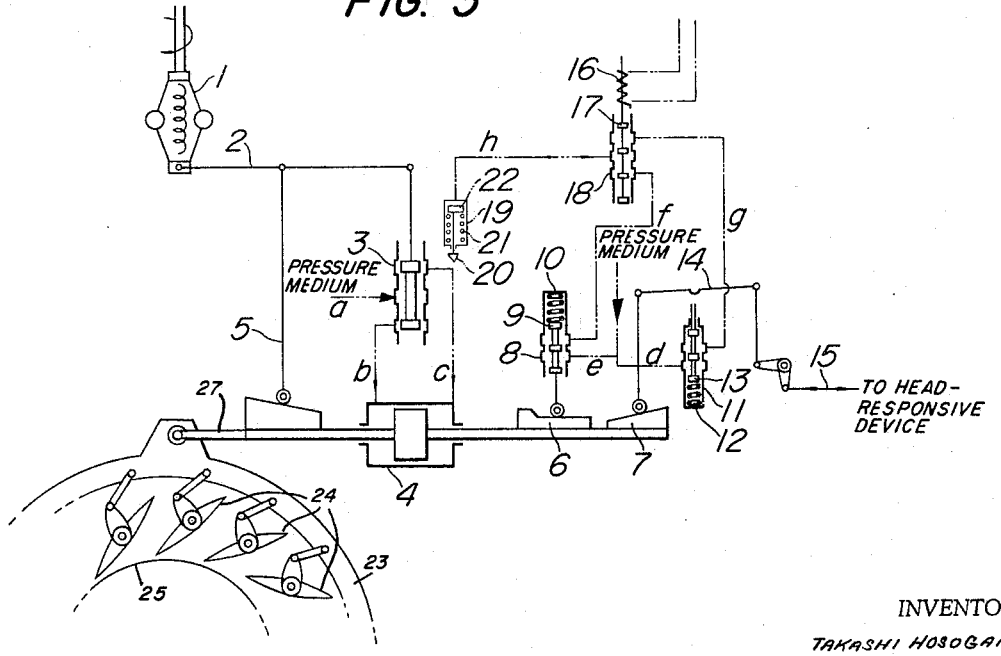
FIG. 3 is a diagrammatic representation of one embodiment of the present invention.

Referring now to FIG. 3, the control system shown and embodying the present invention comprises a conventional speed-responsive means such as a centrifugal governor 1 for operating a distribution valve 3 by means of a lever 2, a servo motor 4 whose operating instruction is under the control of the distribution valve 3 and which controls the conventional water shut-off means illustrated in the form of known guide vanes 23, and a return mechanism 5 for feeding back the servo motor movement to the distribution valve 3. The system further comprises a cam 6 for water-pump operation and a cam 7 for water-turbine operation, these cams 6 and 7 are moved in reciprocation by the servo-motor 4. For water-pump operation, a change-over valve 8 is provided for actuating a throttle valve 20, and comprises a pilot valve element 9 and a bias spring 10, while, for water-turbine operation, a change-over valve 11 is provided and comprises a pilot valve element 13 and a bias spring 12. The change-over valve 11 is operated by the cam 7, as well as, by a water-head responsive means of conventional construction, not shown, through a link 15.

An electro-magnet 16 operates a pilot valve 17 which is actuated downwards when the machine, only partly and schematically illustrated in FIGURE 3, is operated as a water pump, and actuated upwards when the machine is operated as a water turbine. The pilot valve 17 comprises a change-over valve element 18 operated by the upward and downward movements of the pilot valve 17. The throttle valve 20 controls the rate of exhaustion of oil through a conduit $c$ through which the oil pressure is exhausted during the closing operation of servo-motor 4, and is actuated by a piston device 19 having a piston 22 and a bias spring 21.

The system is shown in the state of pump operation in FIG. 3. Thus, the change-over valve 18 is at its down position, and then conduits $g$ and $h$ are disconnected from each other. As a result, even if the change-over valve 11 is operated, it has no functional relation on the throttle valve 20. Under this condition, if the distribution valve 3 is moved downwards in accordance with the control effect of the speed governor 1 to connect a conduit $b$ with a conduit $a$ which is normally supplied with oil under pressure, the servo-motor 4 is moved to the right for effecting the closing operation. In this case, the conduit $c$ serves as an exhaust conduit. Along with the movement toward the right of the servo-motor 4, the cam 6 is moved toward the right, and at the arrival of the desired opening degree, the pilot valve 9 is moved upwardly. As a result, a conduit $e$ normally supplied with oil under pressure is connected to a conduit $f$. The pilot valve 17 being in its down position, the conduit $f$ is in communication with the conduit $h$, and the piston 22 is actuated downwardly against the spring 21, to limit the rate of oil exhaustion through the conduit $c$. Thus, the closing speed of servo-motor 4 is limited from a point of desired degree of opening.

For water-turbine operation, the pilot valve 17 is operated to its up position, where the conduit $f$ is disconnected from the conduit $h$, and instead, the conduit $g$ is connected with the conduit $h$. When the load on the water turbine decreases abruptly, and the servo motor 4 effects abrupt closing operation, i.e., moves toward the right, the cam 7 moves the lever 14 downwardly, and simultaneously therewith the water-head responsive means, not shown, moves the lever 14 also downwardly in response to a certain water head, that is, the distance between the pilot valve 13 and the lever 14 is varied in accordance with both the opening degree of the water shut-off means and the water head and is thus designed to provide the no-load opening degree corresponding to the water head when the lever 14 actuates the pilot valve 13 in the downward direction against the bias of spring 12. As a result, a conduit $d$ normally supplied with oil under pressure is connected to the conduit $g$ which is in communication with the conduit $h$, for operating the throttle valve 20 to limit the oil exhaustion through the conduit $c$. Thus, the closing speed of servo-motor 4 is reduced from about the no-load opening degree shown in FIG. 2.

It is to be understood that various changes and modifications in the embodiment shown are possible within the spirit and scope of the invention.

What we claim is:
1. A control device for controlling the closing operation of water-shut-off means of a water pump-turbine device, comprising:
   water shut-off means for said pump-turbine device,
   first control means operatively connected with said water shut-off means to control the closing characteristics of said water shut-off means under pump operation of the pump-turbine device,
   second control means operatively connected with said water shut-off means for controlling the closing characteristic thereof under turbine operation of said pump-turbine device,
   selecting means operatively connected with said first and second control means for selectively rendering effective either said first or said second control means in accordance with the operating condition of the pump-turbine device,
   and actuating means operatively connecting said first and second control means with said water shut-off means for actuating said water shut-off means by the one of said first and second control means selected by said selecting means.

2. A control device according to claim 1, wherein said second control means includes means providing various closing characteristics in accordance with the water head and the opening degree of said water shut-off means in case of need of the closing operation, the closing speed of said water shut-off means with each of said characteristics being reduced at the non-load opening degree, and said first control means including means providing a predetermined characteristic in accordance with the opening degree of said water shut-off means, the closing speed of said water shut-off means in accordance with said last-mentioned predetermined characteristic being reduced at a predetermined opening degree to prevent extensive mechanical shocks on the pump turbine device.

3. A control device according to claim 1, in which said actuating means includes a servo motor, and in which said first and second control means each include control valve means, and throttling means selectively connected with first and second control means and operatively connected with said servo motor for controlling the rate of movement thereof, said selector means selectively connecting one or the other of said control valve means with said throttling means.

4. A control device according to claim 3, wherein said servo motor includes a control valve determining the movement of the servo motor, speed-responsive means responsive to the speed of the pump-turbine device for actuating said control valve, and feed-back means operatively connecting said servo motor with the connection between said speed-responsive means and said control valve to feed back the movements of said servo motor into said connection.

5. A control device according to claim 4, wherein said second control means includes means responsive to the water head for actuating the control valve means thereof.

6. A control device according to claim 5, wherein said servo motor includes cam means for actuating said first and second valve means.

7. A control device for controlling the closing operation of water shut-off means of a water pump-turbine device, comprising:
   water shut-off means for said pump-turbine device,
   first control means operatively connected with said water shut-off means to control the closing characteristics of said water shut-off means under pump operation of the pump-turbine device,
   second control means operatively connected with said water shut-off means for controlling the closing characteristics thereof under turbine operation of said pump-turbine device including means responsive to the water head and means responsive to the opening degree of the water shut-off means, selecting means operatively connected with said first and second control means for selectively rendering effective either said first or said second control means in accordance with the operating condition of the pump-turbine device, and actuating means operatively connecting said first and second control means with said water shut-off means for actuating said water shut-off means by the one of said first and second control means selected by said selecting means.

No references cited.

MARK NEWMAN, *Primary Examiner.*
JULIUS E. WEST *Examiner.*
W. E. BURNS, *Assistant Examiner.*